United States Patent [19]
Sandhu et al.

[11] Patent Number: 5,486,129
[45] Date of Patent: Jan. 23, 1996

[54] SYSTEM AND METHOD FOR REAL-TIME CONTROL OF SEMICONDUCTOR A WAFER POLISHING, AND A POLISHING HEAD

[75] Inventors: Gurtej S. Sandhu; Trung T. Doan, both of Boise, Id.

[73] Assignee: Micron Technology, Inc., Boise, Id.

[21] Appl. No.: 112,759

[22] Filed: Aug. 25, 1993

[51] Int. Cl.$^6$ .................................................. B24B 49/00
[52] U.S. Cl. ............................. 451/5; 451/6; 451/10; 451/21; 451/55; 451/287; 451/290
[58] Field of Search ...................... 451/5, 6, 7, 8, 451/10, 21, 41, 42, 53, 54, 55, 60, 63, 259, 283, 285, 287, 288, 289, 290, 364, 384, 397, 402; 437/7, 8, 225, 249

[56] References Cited

U.S. PATENT DOCUMENTS

| | | | |
|---|---|---|---|
| 3,156,073 | 10/1964 | Strasbaugh | 51/57 |
| 3,564,776 | 2/1971 | Aspden | 51/55 |
| 3,693,301 | 9/1972 | Lemaitre | 451/55 |
| 3,841,031 | 10/1974 | Walsh | 51/283 |
| 4,083,272 | 4/1978 | Miller | 82/12 |
| 4,193,226 | 3/1980 | Gill, Jr. et al. | 51/124 |
| 4,365,301 | 12/1982 | Arnold et al. | 364/475 |
| 4,450,652 | 5/1984 | Walsh | 451/7 |
| 4,793,895 | 12/1988 | Kaanta et al. | 156/627 |
| 4,811,522 | 3/1989 | Gill, Jr. | 51/131.1 |
| 4,850,152 | 7/1989 | Heynader et al. | 451/8 |
| 4,912,883 | 4/1990 | Chang et al. | 451/1 |
| 4,930,262 | 5/1990 | Sennewald | 51/165.74 |
| 4,940,507 | 7/1990 | Harbarger | 451/36 |
| 5,036,015 | 7/1991 | Sandhu et al. | 437/8 |
| 5,069,002 | 12/1991 | Sandhu et al. | 51/165 |
| 5,081,421 | 1/1992 | Miller et al. | 324/671 |
| 5,081,796 | 1/1992 | Schultz | 51/165.74 |
| 5,085,015 | 2/1992 | Adcock | 451/36 |
| 5,099,614 | 3/1992 | Arai et al. | 451/8 |
| 5,104,828 | 4/1992 | Monroto et al. | 451/10 |
| 5,157,876 | 10/1992 | Medellin | 451/36 |
| 5,205,077 | 4/1993 | Wittstock | 451/8 |
| 5,240,552 | 8/1993 | Yu et al. | 437/225 |

FOREIGN PATENT DOCUMENTS

| | | |
|---|---|---|
| 61-164773A | 7/1986 | Japan . |
| 63-256342A | 10/1988 | Japan . |
| 91-197067/27 | 10/1989 | Japan .............. B24B 37/04 |

*Primary Examiner*—Maurina T. Rachuba
*Attorney, Agent, or Firm*—Wells, St. John, Roberts, Gregory & Matkin

[57] ABSTRACT

A system for polishing a semiconductor wafer includes a rotatable platen subassembly and a drive mechanism coupled to rotate the platen subassembly at a platen velocity. A polishing head supports and holds a face of the semiconductor wafer in contact with the platen subassembly to polish the wafer face whereby individual regions of the wafer face have different polishing rates. The polishing head includes pressure applicators for applying various localized pressures on the individual regions of the semiconductor wafer to conform the wafer face to a selected contour. The system also includes a polish control subsystem for monitoring in situ the polishing rates at various regions of the semiconductor wafer. The polish control subsystem adjusts in situ the platen velocity and/or the individual localized pressures applied to the semiconductor wafer to change the polishing rates of the individual regions of the semiconductor wafer. The system can also be adapted to change other operational parameters, such as wafer velocity, wafer polishing path across the platen, slurry composition and flow rate (for CMP processes), and force applied to the wafer when contacting the platen. A method for polishing a semiconductor wafer is also described.

41 Claims, 4 Drawing Sheets

SYSTEM AND METHOD FOR REAL-TIME CONTROL OF SEMICONDUCTOR A WAFER POLISHING, AND A POLISHING HEAD

TECHNICAL FIELD

This invention relates to a system and method for polishing semiconductor wafers. This invention also relates to polishing heads for use in polishing systems.

BACKGROUND OF THE INVENTION

In the fabrication of integrated circuits, numerous integrated circuits are typically constructed simultaneously on a single semiconductor wafer. The wafer is then later subjected to a singulation process in which individual integrated circuits are singulated from the wafer. At certain stages of fabrication, it is often necessary to polish a surface of the semiconductor wafer. In general, a semiconductor wafer can be polished to remove high topography, surface defects such as crystal lattice damage, scratches, roughness, or embedded particles of dirt or dust. This polishing process is often referred to as mechanical planarization (MP) and is utilized to improve the quality and reliability of semiconductor devices. This process is usually performed during the formation of various devices and integrated circuits on the wafer.

The polishing process may also involve the introduction of a chemical slurry to facilitate higher removal rates and selectivity between films of the semiconductor surface. This polishing process is often referred to as chemical mechanical planarization (CMP).

In general, the polishing process involves holding and rotating a thin flat wafer of semiconductor material against a polishing surface under controlled pressure and temperature. One such apparatus for polishing thin flat semiconductor wafers is discussed in our U.S. Pat. No. 5,081,796. Other apparatuses are described in U.S. Pat. Nos. 4,193,226 and 4,811,522 to Gill, Jr. and U.S. Pat. No. 3,841,031 to Walsh.

One problem encountered in polishing processes is the non-uniform removal of the semiconductor surface. Removal rate is directly proportional to downward pressure on the wafer, rotational speeds of the platen and wafer, slurry particle density and size, slurry composition, and the effective area of contact between the polishing pad and the wafer surface. Removal caused by the polishing platen is related to the radial position on the platen. The removal rate is increased as the semiconductor wafer is moved radially outward relative to the polishing platen due to higher platen rotational velocity. Additionally, removal rates tend to be higher at wafer edge than at wafer center because the wafer edge is rotating at a higher speed than the wafer center.

Another problem in conventional polishing processes is the difficulty in removing non-uniform films or layers which have been applied to the semiconductor wafer. During the fabrication of integrated circuits, a particular layer or film may have been deposited or grown in a desired uneven manner resulting in a non-uniform surface which is subsequently subjected to polishing processes. The thicknesses of such layers or films can be very small (on the order of 0.5 to 5.0 microns), thereby allowing little tolerance for non-uniform removal. A similar problem arises when attempting to polish warped surfaces on the semiconductor wafer. Warpage can occur as wafers are subjected to various thermal cycles during the fabrication of integrated circuits. As a result of this warpage, the semiconductor surface has high and low areas, whereby the high areas will be polished to a greater extent than the low areas.

As a result of these polishing problems, individual regions of the same semiconductor wafer can experience different polishing rates. As an example, one region may be polished at a much higher rate than that of other regions, causing removal of too much material in the high rate region or removal of too little material in the lower rate regions.

A compounding problem associated with polishing semiconductor wafers is the inability to monitor polishing conditions in a effort to detect and correct the above inherent polishing problems as they occur. It is common to conduct numerous pre-polishing measurements of the wafer before commencement of the polishing process, and then conduct numerous similar post-polishing measurements to determine whether the polishing process yielded the desired topography, thickness, and uniformity. However, these pre- and post-polishing measurements are labor intensive and result in a low product throughput.

The present invention provides a polishing system and method which significantly reduces the problems associated with non-uniform removal and monitoring of the polishing process.

BRIEF DESCRIPTION OF THE DRAWINGS

One or more preferred forms of the invention are described herein with reference to the accompanying drawings. Like components and features are referenced by like numerals throughout the drawings. The drawings are briefly described below.

FIG. 3 shows the pressure applicators in their retracted positions.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of this invention, a system for polishing a semiconductor wafer comprises a wafer polishing assembly for polishing a face of a semiconductor wafer at a polishing rate and a polishing uniformity. The wafer polishing assembly has a plurality of controllable operational parameters that upon variation change the polishing rate and polishing uniformity. The system also comprises a controller operably coupled to the wafer polishing assembly for monitoring and managing in situ at least one of the operational parameters of the wafer polishing assembly.

A processor is operably coupled to the controller for determining a set of desired operational parameters based on the monitored operational parameters and for outputting control information indicative of the desired operational parameters to the controller. The controller adjusts in situ at least one of the operational parameters of the wafer polishing assembly in response to the control information from the processor to effectuate a new polishing rate and a new polishing uniformity as the wafer polishing assembly continues to polish the face of the semiconductor wafer.

These operational parameters include platen rotational velocity, wafer rotational velocity, the polishing path of the wafer, the wafer speed across the platen, the down force exerted on the wafer, slurry composition, slurry flow rate, and temperature at the wafer surface.

According to another aspect of this invention, a system for polishing a semiconductor wafer comprises a rotatable platen subassembly which defines a polishing area and a drive mechanism coupled to rotate the platen subassembly at a platen velocity. The system further comprises a polishing head for supporting a semiconductor wafer and holding a face of the semiconductor wafer in contact with the platen subassembly to polish the wafer face whereby individual regions of the wafer face have different polishing rates. The polishing head has pressure applicators for applying various localized pressures on individual regions of the semiconductor wafer to cause the semiconductor wafer to conform the wafer face to a selected contour. The system also comprises a polish control subsystem for monitoring in situ the polishing rates at various regions of the semiconductor wafer and adjusting in situ at least one of the platen velocity and the individual localized pressures applied to the semiconductor wafer to change the polishing rates of the individual regions of the semiconductor wafer.

According to another aspect of the invention, a polishing head for use in a polishing system comprises a wafer carrier sized to accommodate a semiconductor wafer, whereby the semiconductor wafer has a non-exposed face juxtaposed with the wafer carrier and an exposed face to be polished. The polishing head also includes at least one pressure applicator provided on the wafer carrier and operative against the non-exposed face of the semiconductor wafer. The pressure applicator is controllable to apply an isolated pressure to a region of the semiconductor wafer to cause alterations in contour of the exposed face of the semiconductor wafer.

Figure 1:
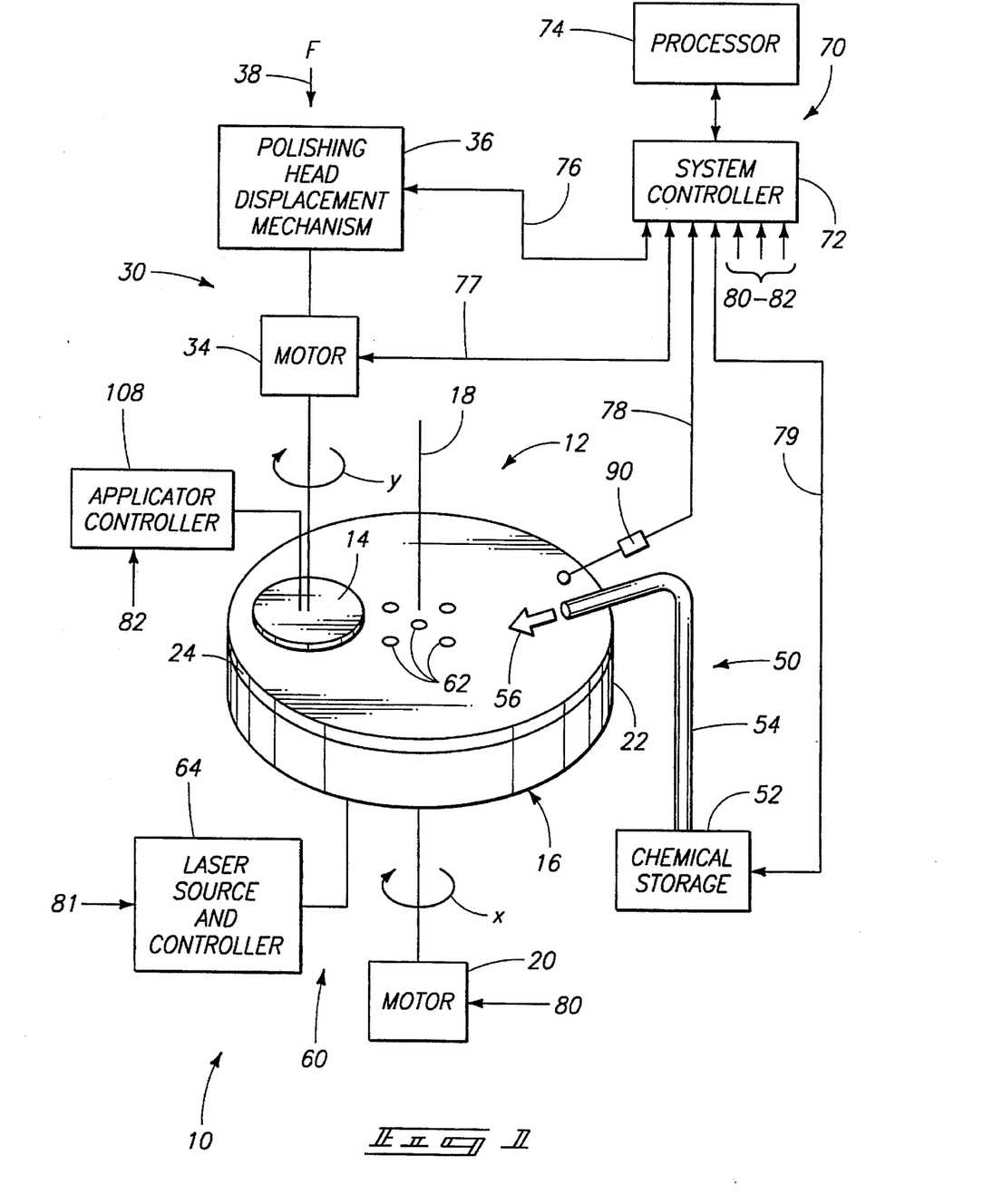
FIG. 1 is a diagrammatic perspective view of a polishing system according to the invention.
Figure 2:
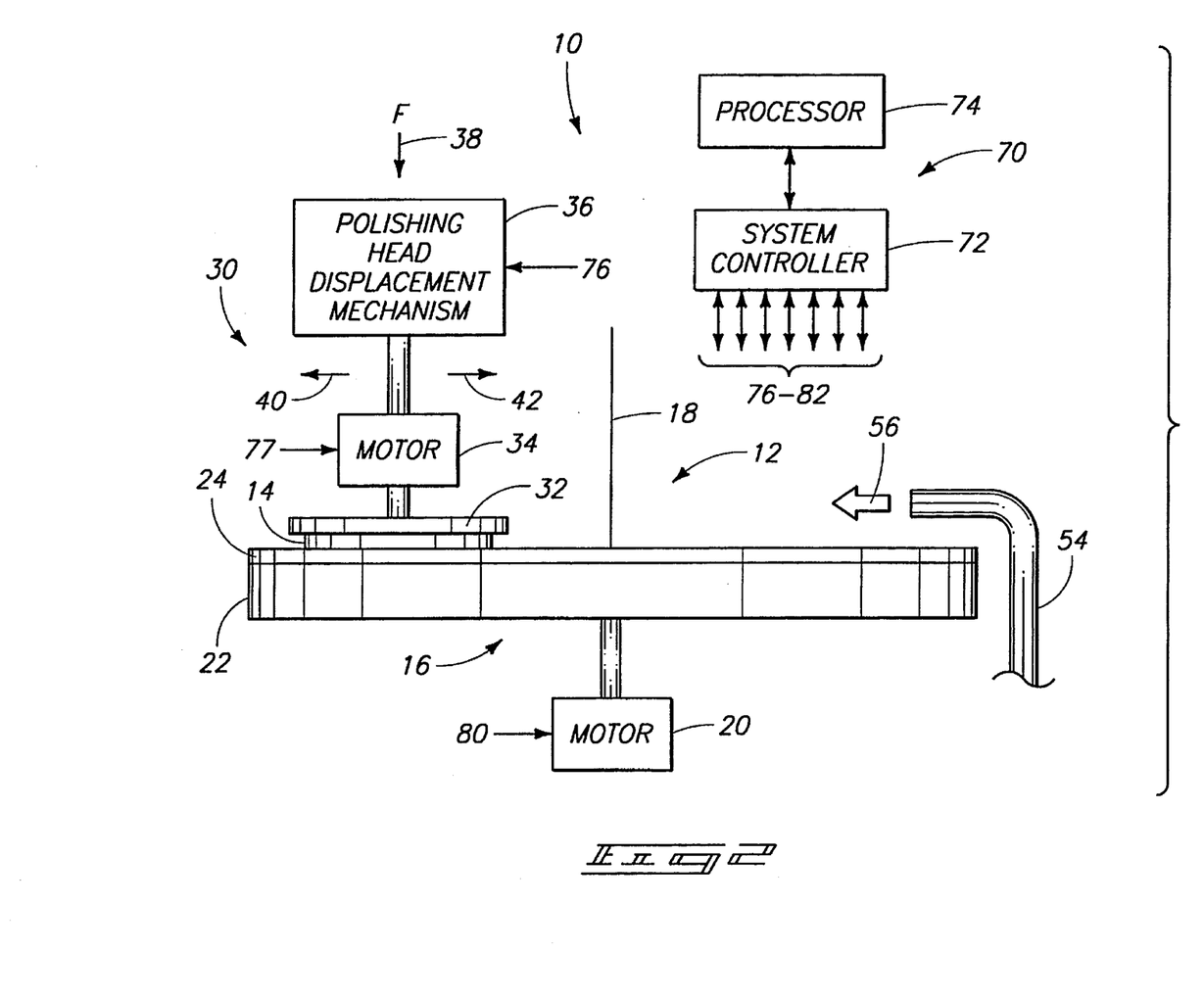
FIG. 2 is a diagrammatic side view of the polishing system.

FIGS. 1–2 are diagrammatical illustrations of a polishing system 10 for polishing a semiconductor wafer. In its preferred form, system 10 includes a chemical or slurry supply system 50 for introducing a chemical slurry into the polishing environment to facilitate wafer polishing. Accordingly, in its preferred form, system 10 is a chemical mechanical planarization (CMP) apparatus. However, as will be more apparent in the continuing discussion, this invention can be practiced using only mechanical polishing techniques without introduction of a chemical slurry.

Polishing system 10 has a wafer polishing assembly 12 for polishing a face of a semiconductor wafer 14. Wafer polishing assembly 12 includes a rotatable platen subassembly 16 that is rotated at a platen velocity $V_P$ about a center axis 18 by a motor or other drive mechanism 20. The platen subassembly can be rotated in a clockwise direction x (FIG. 1) or in the counterclockwise direction. Platen subassembly 16 includes a platen 22 and a pad 24 mounted on the platen. Both the platen 22 and pad 24 are preferably circular. Pad 24 protects platen 22 from the chemical slurry introduced during the polishing process, and is typically made of blown polyurethane. As used in this disclosure, the term "platen subassembly" is intended to include both a platen without a pad (i.e., for some mechanical planarization situations) and a platen provided with a pad (i.e., for chemical mechanical planarization situations).

Wafer polishing assembly 12 also includes polishing head subassembly 30 which consists of polishing head 32 (FIG. 2), motor or other drive mechanism 34, and polishing head displacement mechanism 36. Polishing head 32 supports semiconductor wafer 14 and holds the wafer face in contact with pad 24 of platen subassembly 16. Polishing head 32 applies a controlled downward force F (as illustrated by arrow 38) to press semiconductor wafer 14 into pad 24 to facilitate polishing of the wafer face. Motor 34 rotates polishing head 32 and wafer 14 at a wafer velocity $V_W$ in a clockwise rotational direction y which is preferably the same rotational direction of platen subassembly 16 (although wafer 14 can be rotated in the counterclockwise direction or opposite to rotation of the platen subassembly as desired).

Polishing head displacement mechanism 36 moves polishing head 32 and wafer 14 under controlled force F across platen subassembly 16 as indicated by arrows 40 and 42. The wafer is moved at an adjustable rate and along a variable polishing path. The polishing path can be linear, sinusoidal, or a variety of other patterns. Polishing head displacement mechanism 36 is also capable of moving semiconductor wafer 14 along a polishing path to a location beyond the edge of pad 24 so that wafer 14 "overhangs" the edge. This overhang arrangement permits wafer 14 to be moved partially on and partially off pad 24 to compensate for polishing irregularities caused by relative velocity differential between the faster moving outer portions and the slower moving inner portions of platen subassembly 16.

Polishing head 32 includes means for holding the semiconductor wafer 14. One example holding means is a vacuum-type mechanism which generates a negative vacuum force to draw the wafer against the polishing head. The vacuum-type mechanism is helpful in initially lifting and positioning the wafer on the polishing head. Once the wafer is positioned on the polishing head and held in contact with the platen subassembly for polishing, the vacuum force can be removed. The polishing head is designed with a friction surface, or alternatively includes a carrier pad, which engages the upper, non-exposed face of the wafer and the friction force created between the polishing head and wafer effectively holds the wafer against the polishing head and causes the wafer to rotate at the same velocity as the polishing head. Such polishing heads and carrier pads are of conventional design and are commercially available.

FIGS. 3–6 illustrate another polishing head 100 unique to this invention which can be used in the polishing system 10. Polishing head 100 has a wafer carrier 102 sized to accommodate-semiconductor wafer 14. Wafer carrier 102 has a relatively flat surface and a surrounding, annular flange 104 which defines a holding area. An upper, backside, or non-exposed face of semiconductor wafer 14 lies in juxtaposition with the flat surface of the wafer carrier 102. A lower, frontside, or exposed face of wafer 14 is held in contact with pad 24 during polishing. Flange 104 is sized to extend partially along and around wafer 14 to assist in maintaining the wafer within the holding area.

Figure 3:
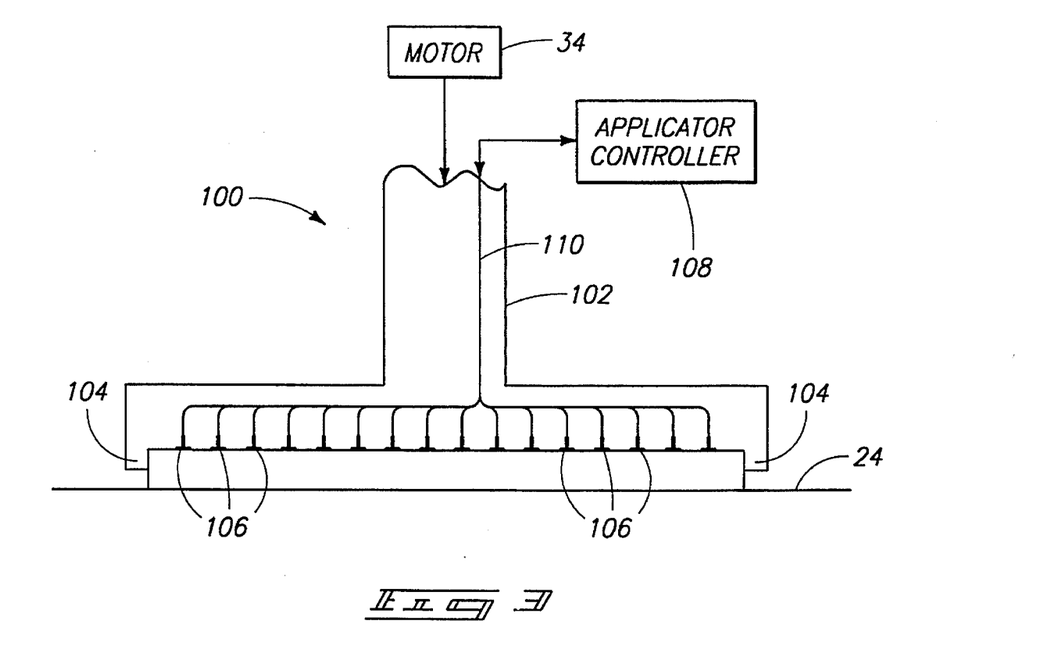
FIG. 3 is a diagrammatic side view of a polishing head according to another aspect of this invention. The polishing head has multiple pressure applicators.
Figure 4:
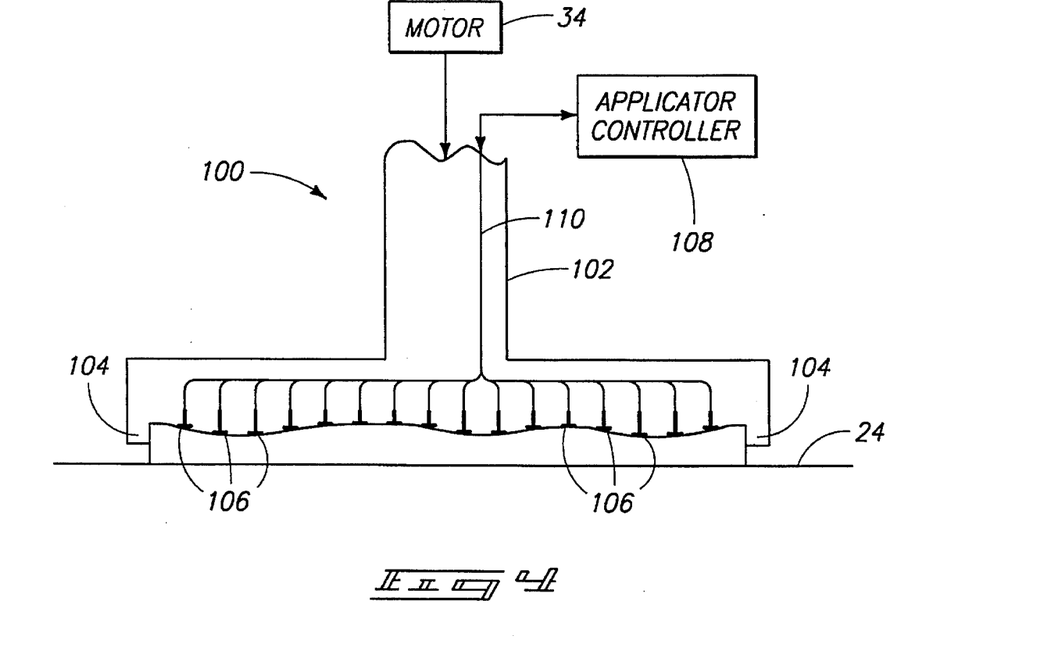
FIG. 4 is a diagrammatic side view similar to FIG. 3 and illustrates some of the pressure applicators in extended positions.

Polishing head 100 also has one or more pressure applicators 106 provided on the wafer carrier 102. The pressure applicators 106 are individually controllable to move over a range of positions from retracted positions (FIG. 3) to extended positions (FIG. 4, for some of the applicators). Under a preferred embodiment, a carrier pad is located over the wafer carrier 102 between the pressure applicators 106 and the wafer. The carrier pad induces an effective friction at the wafer backside to cause the wafer to rotate with the wafer carrier and not slip. The carrier pad is not shown for purposes of clarity in describing the contour changing effect on the wafer caused by the individually controllable pressure applicators.

The applicators 106 operatively engage the non-exposed face of the semiconductor wafer (preferably, through the carrier pad) and, as moved toward their extended positions, apply multiple isolated localized pressures on individual regions of the wafer. The localized pressures cause the semiconductor wafer to bend or bow and alter the contour of the exposed face being held against pad 24.

Figure 5:
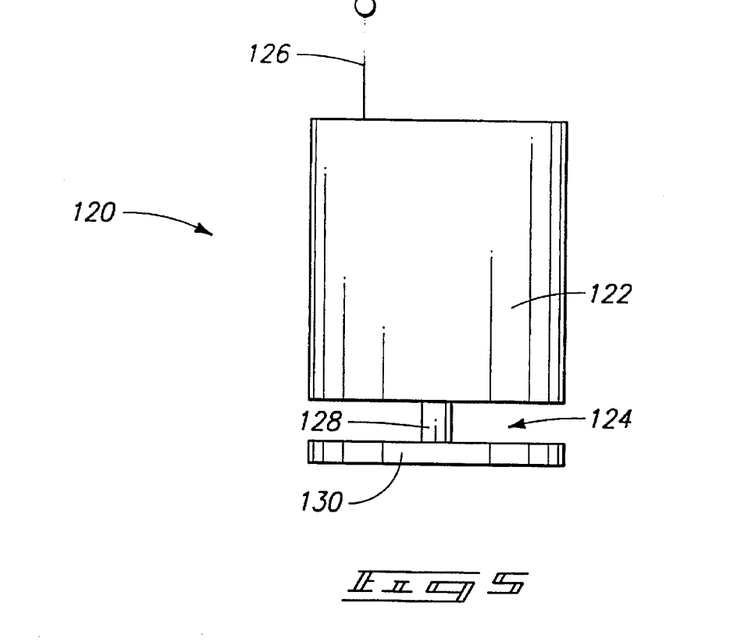
FIG. 5 is an enlarged diagrammatic side view of a pressure applicator for use in the FIG. 3 polishing head according to one embodiment of this invention.
Figure 6:
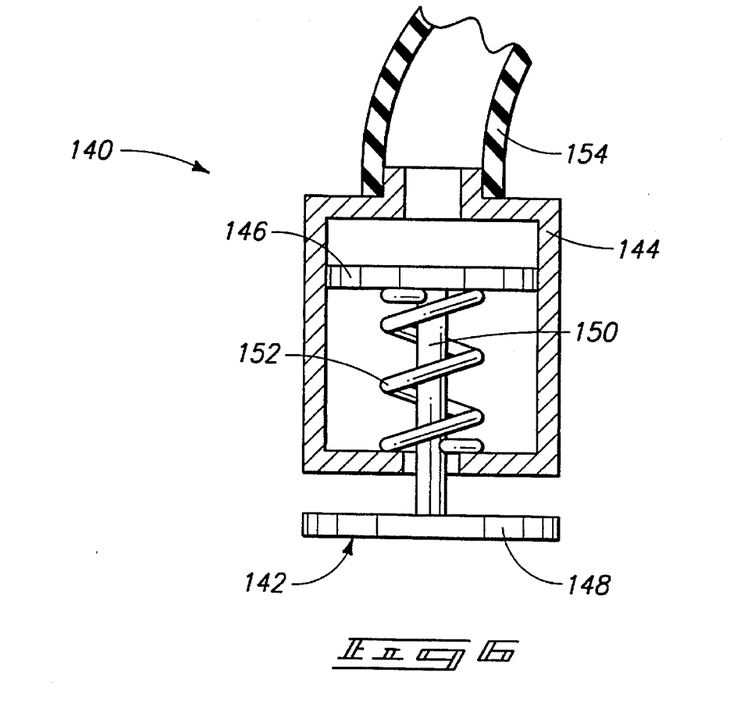
FIG. 6 is an enlarged diagrammatic side view of a pressure applicator for use in the FIG. 3 polishing head according to another embodiment of this invention.

Individual pressure applicators 106 preferably include a slidable piston which controllably moves between a retracted and extended position. FIGS. 5 and 6 show two embodiments of a piston-based pressure applicator. In FIG. 5, pressure applicator 120 comprises a solenoid or servomechanism 122 which operatively drives a piston 124 to a desired position in response to electrical signals received on input line(s) 126. Piston 124 includes a shaft 128 and a flat, circular disk 130 mounted to the shaft.

In FIG. 6, pressure applicator 140 comprises an "T"-shaped piston 142 slidably mounted with a hollow, cylindrical housing 144. Piston 142 has an upper disk 146 sized to fit closely within the interior surface of housing 144, a lower disk 148 positioned outside of housing 144, and a shaft 150 interconnecting the two disks. A spring 152 is disposed about shaft 150 between a bottom wall or floor of housing 144 and the upper disk 146 to bias the piston 142 to its retracted position. Housing 144 has an upper opening which is operatively coupled to a tube or conduit 154 to provide fluid communication between the conduit 154 and the housing chamber. A fluid (which can be gas or liquid) is transferred under controlled pressure through conduit 154 against upper piston disk 146, whereby the pressure is effective to overcome the bias of spring 152 to cause the desired movement of piston 142.

As shown in FIGS. 3 and 4, applicators 106 are individually coupled to an applicator controller 108 via a suitable connecting means 110. When the servomechanism pressure applicators 120 of FIG. 5 are used, applicator controller 108 consists of a servo-electric applicator controller which generates electric signals that operatively position the servomechanism pressure applicators 120. The connecting means 110 consists of a bus or conductors suitable to carry the electric signals from the servo-electric applicator controller to individual applicators and to provide feedback. On the other hand, when pressure applicators 140 of FIG. 6 are employed, applicator controller 108 consists of a fluid force generator which outputs a fluid under a controlled pressure. The connecting means 110 consists of tubing or conduits to transfer fluid under pressure from the fluid force generator to individual applicators.

According to the polishing head of this invention, the polishing rates of individual regions across the wafer face can be independently controlled to effectuate the desired polishing results. Prior to this invention, the semiconductor experienced different polishing rates in various regions across the wafer face caused by the polishing environment including such things as platen velocity, wafer velocity, slurry composition, type of material on the wafer face, the down force applied to the wafer, and wafer movement across the platen. This invention is advantageous because it provides superior control in selectively isolating and changing the polishing rates of specific regions of the semiconductor wafer in a real-time manner during polishing while globally polishing the entire wafer.

With reference again to FIGS. 1 and 2, wafer polishing assembly 12 also includes chemical supply system 50 for introducing a chemical slurry of a desired composition. Chemical supply system 50 has a chemical storage 52 for storing slurry and a conduit 54 for transferring the slurry from chemical storage 52 to the polishing area atop platen subassembly 16. Chemical supply system 52 introduces slurry as indicated by arrow 56 atop pad 24 at a selected flow rate. This chemical slurry provides an abrasive material which facilitates polishing of the wafer face, and is preferably a composition formed of a solution including solid alumina or silica. However, according to this invention, the composition can be controllably altered to add or remove individual chemicals from the slurry, or to change the ratios within the composition.

Wafer polishing assembly 12 has a film thickness measurement device 60 for measuring topography of the wafer face during polishing. Film thickness measurement device 60 is preferably implemented in the form of a laser interferometer measuring apparatus which employs interference of light waves for purposes of measurement. The laser interferometer measuring apparatus includes light transmitter/receiver units 62 provided at the surface of the platen subassembly 16 which transmit light at the wafer face and collect reflections therefrom. The laser apparatus also includes laser source and controller 64 which is optically coupled to units 62. The laser apparatus is configured to measure thicknesses and contour of films and materials on the wafer face. Apart from the laser apparatus, this invention also contemplates other techniques and systems that can be used as a film thickness measurement device including a system for measuring capacitance change during wafer polishing, a device for detecting friction change at the wafer surface, and an acoustic mechanism for measuring wave propagation as films and layers are removed during polishing.

Wafer polishing assembly 12 also includes a temperature sensor 90 positioned to detect temperature within the polishing area atop the pad 24.

Polishing system 10 further includes a polish control subsystem 70 for monitoring in situ the operating parameters of the polishing system and adjusting in situ one or more polishing parameters to effectuate the desired polishing results for a particular semiconductor wafer. The operating parameters are such that variation of one or more of the parameters effectively changes the polishing rates and polishing uniformity across the wafer face.

Polish control subsystem 70 includes a system controller 72 and a processor 74. System controller 72 is operatively coupled to the components of the system via connectors 76–82 to monitor and manage in real-time at least one of the operational parameters. The parameters are input to processor 74 which determines the present state polishing status of the semiconductor wafer, including polishing uniformity and various polishing rates across the wafer. Processor 74 then determines a set of desired operational parameters which effectuates the desired polishing uniformity and rates, and outputs control information indicative of these desired parameters. Processor 74 can be embodied as a microprocessor, an ASIC, or some other processing means for determining the desired operational parameters. Processor 74 may include computational means for calculating specific parameters, memory look-up tables for generating values given the measured parameters, or neural networks and fuzzy logic techniques for systematically arriving at optimal parameters.

The controller 72 uses the control information to adjust the system components and thereby modify the operational parameters which will tend to subject the wafer to polishing conditions that more closely approximate the desired polishing uniformity and rates. More specifically, controller 72 is coupled to polishing head displacement mechanism 36 via connector 76 to monitor and controllably adjust in situ the polishing path of the semiconductor wafer and the speed at which the wafer is moved across the platen subassembly 16. Controller 72 is coupled to motor 34 via connector 77 to monitor the motor rpm and wafer velocity imparted by the polishing head. Controller 72 commands the motor to speed up or slow down based on the information received from processor 74. Controller 72 is coupled to motor 20 via connector 80 to monitor the motor rpm and platen velocity of platen subassembly 16, and to adjust the speed of the platen subassembly as desired.

Controller 72 is connected to slurry supply means 50 via connector 79 to monitor and adjust slurry composition and flow rate. Controller 72 is coupled to temperature sensor 90 via connector 78 to receive feedback information concerning temperature of the polishing environment and wafer surface. Connector 81 conveys control signals and feedback information between controller 72 and film thickness measurement device 60.

When system 10 is adapted to incorporate polishing head 100 of FIGS. 3 and 4, applicator controller 108 is operatively coupled via connector 82 to system controller 72. According to this embodiment, controller 72 can make independent adjustments to one or more of the pressure applicators 106 on head 100, causing manipulation of the wafer face contour. This control permits regional or localized polishing with a semiconductor wafer.

Controller 72 works in conjunction with film thickness measurement device 60 to determine the polishing rates and uniformity across the wafer during real-time evaluations. This information is passed to processor 74 which then generates a map indicative of the polish rates and/or uniformity across the semiconductor wafer face for use in adjusting system operational parameters. Preferably, this map is generated on a periodic basis.

According to another aspect of this invention, a method for polishing a semiconductor wafer comprises the following steps: (a) polishing a face of a semiconductor wafer at a polishing rate and a polishing uniformity according to a set of controllable operational parameters that upon variation change the polishing rate and polishing uniformity; (b) monitoring in situ at least one of the operational parameters of the wafer polishing assembly; (c) determining a set of desired operational parameters based upon the monitored operational parameters and outputting control information indicative of the desired operational parameters; and (d) adjusting in situ at least one of the operational parameters in response to the control information to effectuate a new polishing rate and a new polishing uniformity and then continuing polishing of the semiconductor wafer face according to the new polishing rate and new polishing uniformity.

System 10 is therefore a fully automatic, computer driven apparatus that can polish a wafer, monitor results in situ, and make appropriate modifications in a real-time manner without any human intervention. The invention is advantageous over prior art polishing apparatus because it largely reduces the number of pre- and post-polishing measurements and significantly enhances throughput. The system enhances both efficiency and quality.

In compliance with the statute, the invention has been described in language necessarily limited in its ability to properly convey the conceptual nature of the invention. Because of this inherent limitation of language, it must be understood that the invention is not necessarily limited to the specific features shown and described, since the means and methods herein disclosed comprise merely preferred forms of putting the invention into effect. The invention is, therefore, claimed in any of its forms or modifications within the proper scope of the appended claims appropriately interpreted in accordance with the doctrine of equivalents.

We claim:

1. A system for polishing a semiconductor wafer comprising:

a wafer polishing assembly for polishing a face of a semiconductor wafer at a polishing rate and a polishing uniformity, the wafer polishing assembly including a platen rotatable about a first axis, a polishing head which supports the semiconductor wafer for rotation about a second axis, and a polishing head displacement mechanism which moves the polishing head and wafer across the platen, the wafer polishing assembly having a plurality of controllable operational parameters that upon variation change the polishing rate and polishing uniformity;

a controller operably coupled to the wafer polishing assembly for monitoring and managing in situ at least one of the operational parameters of the wafer polishing assembly;

a processor operably coupled to the controller for determining a set of desired operational parameters based on the monitored operational parameters and outputting control information indicative of the desired operational parameters to the controller; and the controller adjusting in situ at least one of the operational parameters of the wafer polishing assembly in response to the control information from the processor to effectuate a new polishing rate and a new polishing uniformity as the wafer polishing assembly continues to polish the face of the semiconductor wafer.

2. A system according to claim 1 wherein the controller is configured to monitor and manage a plurality of the operational parameters.

3. A system according to claim 1 wherein the wafer polishing assembly includes a film thickness measurement device positioned to measure topography of the semiconductor wafer face during polishing.

4. A system according to claim 1 wherein the platen rotates at a variable platen velocity, the controller being coupled to monitor the platen velocity and to controllably adjust in situ the platen velocity in response to the control information from the processor.

5. A system according to claim 1 wherein the polishing head rotates at a variable wafer velocity, the controller being coupled to monitor the wafer velocity and to controllably adjust in situ the wafer velocity in response to the control information from the processor.

6. A system according to claim 1 wherein the wafer polishing assembly includes a platen subassembly and a polishing head for supporting and moving the semiconductor wafer across the platen subassembly along an adjustable polishing path, the controller being coupled to controllably adjust in situ the polishing path in response to the control information from the processor.

7. A system according to claim 1 wherein the polishing head moves the semiconductor wafer across the platen subassembly at a wafer movement rate, the controller being coupled to controllably adjust in situ the wafer movement rate in response to the control information from the processor.

8. A system according to claim 1 wherein the wafer polishing assembly includes a platen subassembly and a polishing head for supporting the semiconductor wafer, the polishing head holding the semiconductor wafer in contact with the platen subassembly under a force, the controller being coupled to monitor the force exerted by the polishing head and to controllably adjust in situ the exerted force in response to the control information from the processor.

9. A system according to claim 1 wherein the wafer polishing assembly includes a polishing head for supporting the semiconductor wafer, the polishing head having a plurality of localized pressure applicators for exerting pressures at individual regions of the semiconductor wafer to cause the wafer to deform in a manner that the wafer face has a selected contour.

10. A system according to claim 1 wherein the wafer polishing assembly includes a polishing head for supporting the semiconductor wafer, the polishing head having a plurality of localized pressure applicators for exerting pressures at individual regions of the semiconductor wafer to cause the wafer to deform in a manner that the wafer face has a selected contour, the controller being coupled to individually adjust in situ the localized pressure applicators to change the contour of the wafer face in response to the control information from the processor.

11. A system according to claim 1 wherein the wafer polishing assembly includes a slurry supply means for introducing a slurry of a selected composition at a flow rate, the controller being coupled to monitor the flow rate and to controllably adjust in situ the flow rate in response to the control information from the processor.

12. A system according to claim 1 wherein the wafer polishing assembly includes a slurry supply means for introducing a slurry of a selected composition at a flow rate, the controller being coupled to monitor the slurry composition and to controllably adjust in situ the slurry composition in response to the control information from the processor.

13. A system according to claim 1 wherein the controller is configured to monitor a temperature at the wafer face during polishing.

14. A system according to claim 1 wherein the processor determines a set of desired operational parameters and generates control information on a periodic basis.

15. A system for polishing a semiconductor wafer comprising:

a rotatable platen subassembly defining a polishing area;

a drive mechanism coupled to rotate the platen subassembly at a platen velocity;

a polishing head for supporting a semiconductor wafer and holding a face of the semiconductor wafer in contact with the platen subassembly to polish the wafer face whereby individual regions of the wafer face have different polishing rates, the polishing head being movable across the platen subassembly;

the polishing head having pressure applicators for applying various localized pressures on the individual regions of the semiconductor wafer to conform the wafer face to a selected contour; and a polish control subsystem for monitoring in situ the polishing rates at various regions of the semiconductor wafer, the polish control subsystem adjusting in situ the platen velocity, the individual localized pressures applied to the semiconductor wafer to change the polishing rates of the individual regions of the semiconductor wafer.

16. A system according to claim 15 wherein the polishing head includes:

a wafer carrier sized to accommodate the semiconductor wafer; and a plurality of controllable pistons provided on the wafer carrier and operative to contact the semiconductor wafer, the controllable pistons being positionable at extended positions and retracted positions to apply the localized pressures to the semiconductor wafer.

17. A system according to claim 15 wherein individual pressure applicators comprise a slidable piston which moves over a range of positions between an extended position and a retracted position to apply the localized pressures to the semiconductor wafer; and the system further comprises an applicator controller for selectively causing individual pistons to move to a position within the range.

18. A system according to claim 15 wherein individual pressure applicators comprise a slidable piston which moves over a range of positions between an extended position and a retracted position and a biasing means for urging the piston to the retracted position; and the system further comprises a fluid force generator operatively coupled to the pistons to individually move the pistons toward respective extended positions by selectively applying various fluid forces.

19. A system according to claim 15 wherein individual pressure applicators comprise a slidable servo piston which moves over a range of positions between an extended position and a retracted position; and the system further comprises a servo-electric applicator controller coupled to individual pistons for generating electrical signals which operatively position the servo pistons in desired positions within the position range.

20. A system according to claim 15 wherein the polishing head is configured to rotate the semiconductor wafer at a wafer velocity, the polish control subsystem being coupled to monitor the wafer velocity and to controllably adjust in situ the wafer velocity.

21. A system according to claim 15 wherein the polish control subsystem is coupled to controllably adjust in situ the polishing path.

22. A system according to claim 15 wherein the polishing head is configured to move the semiconductor wafer across the platen subassembly at a wafer movement rate, the polish control subsystem being coupled to controllably adjust in situ the wafer movement rate.

23. A system according to claim 15 further comprising a slurry supply means for introducing a slurry of a selected composition at a flow rate, the polish control subsystem being coupled to controllably adjust in situ at least one of the composition and the flow rate.

24. A polishing head for use in polishing a semiconductor wafer, the polishing head comprising:

a rotatable wafer carrier including a recess sized to accommodate a semiconductor wafer, the semiconductor wafer having a non-exposed face juxtaposed with the wafer carrier and an exposed face to be polished; and a plurality of pressure applicators provided on the wafer carrier and in contact with the non-exposed face of the semiconductor wafer, the pressure applicators being controllable to apply isolated pressures to respective regions of the semiconductor wafer to cause alterations in contour of the exposed face of the semiconductor wafer.

25. A polishing head according to claim 24 further comprising a plurality of pressure applicators provided on the wafer carrier.

26. A polishing head according to claim 24 wherein the pressure applicators respectively comprise a slidable piston which moves between an extended position and a retracted position.

27. A polishing head according to claim 24 wherein the pressure applicators respectively comprise a spring-biased slidable piston which moves between an extended position and a retracted position.

28. A method for polishing a semiconductor wafer comprising the following steps:

providing a wafer polishing assembly for polishing a face of a semiconductor wafer at a polishing rate and a polishing uniformity, the wafer polishing assembly including a platen subassembly rotatable about a first axis, a polishing head which supports the semiconductor wafer for rotation about a second axis, and a polishing head displacement mechanism which moves the polishing head and wafer across the platen subassembly at an adjustable rate;

using the wafer polishing assembly to polish a face of a semiconductor wafer at a polishing rate and a polishing uniformity according to a set of controllable operational parameters that upon variation change the polishing rate and polishing uniformity;

monitoring in situ at least one of the operational parameters of the wafer polishing assembly;

determining a set of desired operational parameters based upon the monitored operational parameters and outputting control information indicative of the desired operational parameters; and adjusting in situ at least one of the operational parameters in response to the control information to effectuate a new polishing rate and a new polishing uniformity and then continuing polishing of the semiconductor wafer face according to the new polishing rate and new polishing uniformity.

29. A method according to claim 28 further comprising the step of monitoring a plurality of the operational parameters.

30. A method according to claim 28 further comprising the step of measuring topography of the semiconductor wafer face during polishing.

31. A method according to claim 28 wherein the step of polishing comprises:

rotating the platen subassembly at a platen velocity;

rotating the semiconductor wafer at a wafer velocity;

holding the semiconductor wafer against the platen subassembly under a prescribed down force; and wherein the step of monitoring at least one operational parameter comprises monitoring a parameter selected from a group consisting essentially of platen velocity, wafer velocity, and down force.

32. A method according to claim 28 wherein the step of polishing comprises:

rotating the platen subassembly;

moving the semiconductor wafer across the rotating platen at a velocity and along a polishing path; and wherein the step of adjusting at least one operational parameter comprises adjusting a parameter selected from a group consisting essentially of the velocity of the semiconductor wafer across the platen and the polishing path of the semiconductor wafer.

33. A method according to claim 28 wherein the step of polishing comprises introducing a slurry of a selected composition at a flow rate; and wherein the step of adjusting at least one operational parameter comprises adjusting a parameter selected from a group consisting essentially of slurry composition and the flow rate.

34. A method according to claim 28 further comprising monitoring a temperature at the wafer face during polishing.

35. A method for polishing a semiconductor wafer comprising the following steps:

polishing a face of a semiconductor wafer according to a set of controllable operational parameters which yields different polishing rates at various regions of the semiconductor wafer face using a polishing head including a rotatable wafer carrier including a recess sized to accommodate a semiconductor wafer, the semiconductor wafer having a non-exposed face juxtaposed with the wafer carrier and an exposed face to be polished and a plurality of pressure applicators on the wafer carrier and in contact with the non-exposed face of the semiconductor wafer, the pressure applicators being controllable to apply isolated pressure to respective regions of the semiconductor wafer to cause alterations in contour of the exposed face of the semiconductor wafer;

monitoring in situ the polishing rates of the regions of the semiconductor wafer face; and adjusting in situ at least one operating parameter to change the polishing rates of at least one region.

36. A method according to claim 35 wherein the step of monitoring the polishing rate comprises measuring topography of the semiconductor wafer face during polishing.

37. A method according to claim 35 wherein the step of monitoring the polishing rate comprises measuring topography of the semiconductor wafer face during polishing; and the method further comprising the step of generating a map indicative of the topography of the semiconductor wafer face.

38. A method according to claim 35 further comprising applying a localized pressure to a region of the semiconductor wafer to effectuate change in the polishing rate of that region.

39. A polishing head for use in polishing a semiconductor wafer, the polishing head comprising:

a wafer carrier sized to support a semiconductor wafer, the semiconductor wafer having a non-exposed face juxtaposed with the wafer carrier and an exposed face to be polished; and a plurality of pressure applicators provided on the wafer carrier and operative against the non-exposed face of the semiconductor wafer, the pressure applicators being controllable to apply isolated pressures to respective regions of the semiconductor wafer to cause alterations in contour of the exposed face of the semiconductor wafer.

40. A system for polishing a semiconductor wafer comprising:

a platen subassembly defining a polishing area;

a polishing head for supporting a semiconductor wafer and holding a face of the semiconductor wafer in contact with the platen subassembly to polish the wafer face wherein individual regions of the wafer face have different polishing rates;

the polishing head having pressure applicators for applying various localized pressures on the individual regions of the semiconductor wafer to conform the wafer face to a selected contour; and a polish control subsystem for monitoring in situ the polishing rates at various regions of the semiconductor wafer, the polish control subsystem adjusting in situ the individual localized pressures applied to the semiconductor wafer to change the polishing rates of the individual regions of the semiconductor wafer.

41. A polishing head for use in polishing a semiconductor wafer, the polishing head comprising:

a wafer carrier including means for supporting a semiconductor wafer, the semiconductor wafer having a non-exposed face juxtaposed with the wafer carrier and an exposed face to be polished; and means for causing alterations in contour of the exposed face of the semiconductor wafer.

* * * * *